(12) United States Patent
Matsubara et al.

(10) Patent No.: US 6,834,891 B2
(45) Date of Patent: Dec. 28, 2004

(54) PIPE JOINT

(75) Inventors: Satoshi Matsubara, Koga (JP); Mitsuo Kaishio, Koga (JP)

(73) Assignee: Sanoh Kogyo Kabushiki Kaisha, Ibaraki-Ken (JP)

( * ) Notice: Subject to any disclaimer, the term of this patent is extended or adjusted under 35 U.S.C. 154(b) by 0 days.

(21) Appl. No.: 10/451,765

(22) PCT Filed: Jan. 11, 2002

(86) PCT No.: PCT/JP02/00145

§ 371 (c)(1),
(2), (4) Date: Jun. 23, 2003

(87) PCT Pub. No.: WO02/055918

PCT Pub. Date: Jul. 18, 2002

(65) Prior Publication Data

US 2004/0108717 A1 Jun. 10, 2004

(30) Foreign Application Priority Data

Jan. 15, 2001 (JP) .......................................... 2001-006502
Nov. 16, 2001 (JP) .......................................... 2001-351610

(51) Int. Cl.$^7$ ............................................. F16L 39/00
(52) U.S. Cl. ......................... 285/319; 285/330; 285/39
(58) Field of Search ................................. 285/330, 233, 285/319, 328, 39, 305, 308

(56) References Cited

U.S. PATENT DOCUMENTS 3,685,860 A * 8/1972 Schmidt ...................... 285/328
4,793,637 A * 12/1988 Laipply et al. ............... 285/39
5,542,716 A 8/1996 Szabo et al.
5,860,681 A * 1/1999 Slais .......................... 285/305
5,951,063 A * 9/1999 Szabo ........................ 285/319

FOREIGN PATENT DOCUMENTS

| JP | 01-112098 | 4/1989 |
| JP | 03-130488 | 12/1991 |
| JP | 10-509232 | 9/1998 |

* cited by examiner

Primary Examiner—Eric K. Nicholson
Assistant Examiner—Aaron Dunwoody
(74) Attorney, Agent, or Firm—Ladas & Parry LLP

(57) ABSTRACT

A pipe connecting device includes a female connecting member and a male connecting member. The female and the male connecting member can be restrained from turning relative to each other without using additional locking cover or the like and without being subject to various restrictions placed by actual piping conditions. A retainer (46) is provided with retaining parts (56a, 56b) that engage with an annular ridge (54) formed on the male connecting member (44) to restrain the male connecting member (44) from axial movement relative to the female connecting member (42), A noncircular part of the male connecting member (44) and the retaining parts (56a and 56b) of the retainer (46) constitute a locking structure for restraining the male and the female connecting member (44, 42) from turning relative to each other.

10 Claims, 11 Drawing Sheets

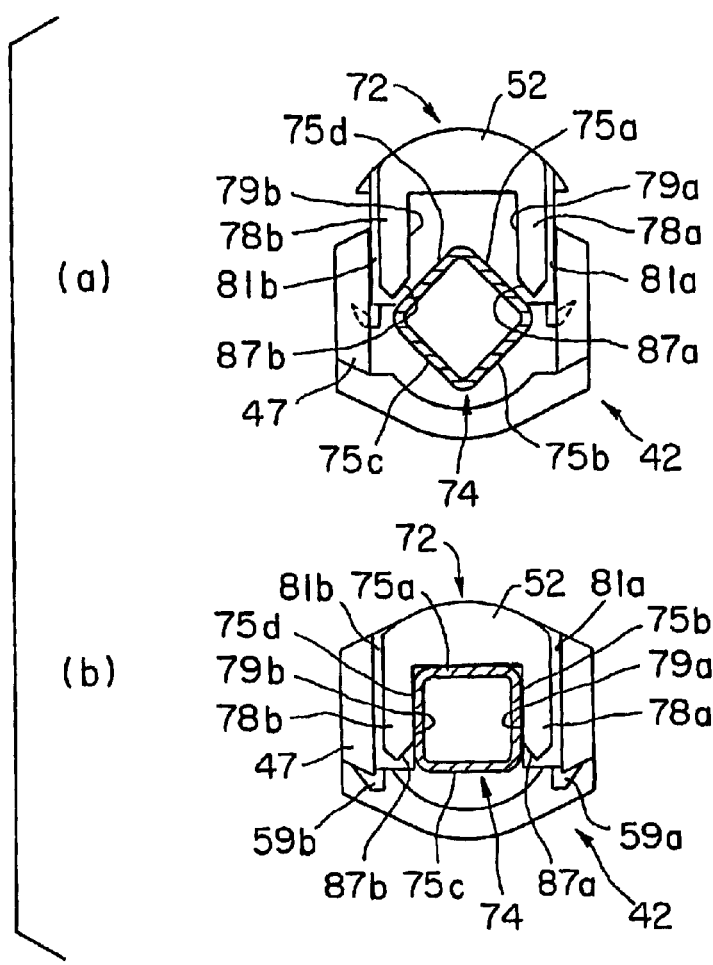
F I G. 12
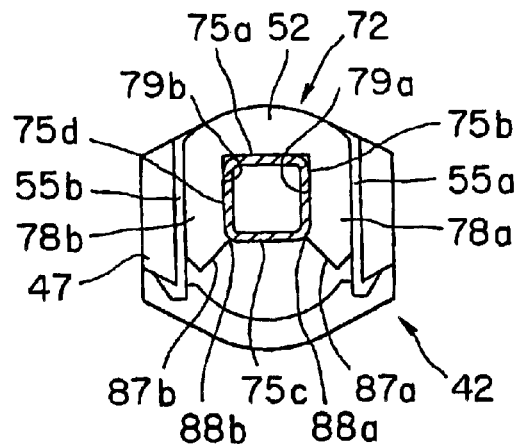
F I G. 13

PIPE JOINT

TECHNICAL FIELD

The present invention relates to a pipe connecting device and, more particularly, to a quick-connection pipe connecting device to be used for connecting pipes or tubes in a fluid circuit of a mechanical device.

BACKGROUND ART

An automotive fuel supply system uses quick-connection pipe connecting devices for connecting fuel pipes. A quick-connection pipe joint includes, as principal components, a male connecting member, a female connecting member, and a retainer for coupling together the male and the female connecting member. Pipes can be readily connected simply by fitting the male connecting member in the female connecting member.

Quick-connection pipe connecting devices of various kinds of construction have been devised. The quick-connection pipe connecting device needs to have a function to achieve firm union, a function to facilitate connection and disconnection, and a function to ensure high sealing performance.

Shown in FIG. 14 in a longitudinal sectional view is a conventional quick-connection pipe connecting device 10 including a female connecting member 12, a male connecting member 14 and a retainer 16, and widely applied to automotive fuel supply systems. In FIG. 14, the female connecting member 12 and the male connecting member 14 are coupled completely by the retainer 16.

Basically, the quick-connection pipe connecting device 10 is constructed to make the retainer 16 lock the female connecting member 12 and the male connecting member 14 together to connect the female connecting member 12 and the male connecting member 14 completely simply by pushing the male connecting member 14 into the female connecting member 12 fitted with the retainer 16.

The female connecting member 12 includes, for example, a connecting part 13 to be pressed in a resin tube 11, and a cylindrical housing 15 formed integrally with the connecting part 13. The male connecting member 14 is fitted in the housing 15. The housing 15 has a connecting part 18 having a large inside diameter and a large outside diameter. Large rectangular openings 19a and 19b are formed diametrically opposite to each other in the sidewall of the connecting part 18. The housing 15 has a first cylindrical part 20a of an outside diameter smaller than that of the connecting part 18 and extending from the connecting part 18, and a second cylindrical part 20b of an outside diameter smaller than that of the first cylindrical part 20a and extending from the first cylindrical part 20a. A stepped passage 17 extends axially through the connecting part 18, the first cylindrical part 20a, the second cylindrical part 20b and the connecting part 13. O rings 21a and 21b are fitted in the bore of the first cylindrical part 20a and are spaced out by a spacer 22. The O rings 21a and 21b are retained in place in the first cylindrical part 20a by an O-ring retainer 23 having the shape of a sleeve and fitted in a part of the bore on the side of the connecting part 18.

The male connecting member 14 is provided with an annular ridge 54 on its outer surface at a predetermined distance from its front end. Retaining lugs 26a and 26b formed in the retainer 16 engage with the annular ridge 54 to retain the male connecting member 14 in place.

The retainer 16 is a flexible member formed of a plastic material and split in two parts so as to be bendable in directions perpendicular to its axis. The retainer 16 has a main part 25, and the retaining projections 26a and 26b project obliquely inward from positions diametrically opposite to each other on the inner surface of the main part 25. The retaining lugs 26a and 26b have tips 27a and 27b that engage with the annular ridge 54 of the male connecting member 14. The retaining lugs 26a and 26b are provided with locking projections 28a and 28b on their outer surfaces. The locking projections 28a and 28b engage with end edges 29a and 29b, on the side of the open end of the connecting part 18, of the openings 19a and 19b of the connecting part 18, respectively.

The retainer 16 is put on the female connecting member 12, and then the male connecting member 14 is pushed into the connecting part 18 of the female connecting member 12. Then the tips 27a and 27b of the retaining lugs 26a and 26b of the retainer 16 engage with the annular ridge 54 of the male connecting member 14, and the locking projections 28a and 28b engage with the end edges 29a and 29b of the openings 19a and 19b of the connecting part 18 to lock together the female connecting member 12 and the male connecting member 14. Even if the male connecting member 14 is pulled axially, the locking projections 28a and 28b of the retainer 16 restrain the male connecting member 14 from axial movement, so that the female connecting member 12 and the male connecting member cannot be separated.

The female connecting member 12 and the male connecting member 14 of the conventional quick-connection pipe connecting device 10 are thus connected together and are restrained from axial movement relative to each other by the retainer 16. However, the female connecting member 12 and the male connecting member 14 are able to turn relative to each other. Sometimes, the female connecting member 12 and the male connecting member 14 turn relative to each other when the quick-connection pipe connecting device 10 is exposed to vibrations. When the quick-connection pipe connecting device 10 is employed in an automotive fuel supply system, and the female connecting member 12 and the male connecting member 14 are held on different vibrating systems, such as the engine and the body of an automobile, the female connecting member 12 and the male connecting member 14 turn ceaselessly relative to each other. Consequently, the O rings 21a and 21b are abraded and the sealing effect of the O rings is deteriorated. Eventually, it is possible that fuel leaks from the quick-connection pipe connecting device 10.

Since the conventional quick-connection pipe connecting device 10 is not provided with any structure that restrains the female connecting member 12 and the male connecting member 14 from turning relative to each other, the female connecting member 12 and the male connecting member 14 are restrained from turning relative to each other by a locking cover as shown in FIGS. 15 to 18.

Shown in FIG. 15 is a locking cover 32 of a hard resin to be used in combination with an elbow-type pipe connecting device having a male connecting member 14 having the shape of a 90° elbow. In FIG. 15 indicated at 30 is the body frame of an automobile. The male connecting member 14 is attached to the body frame 30, and a female connecting member 12 is connected to a resin tube 11. A locking cover 32 has a U-shaped cross section. The locking cover 32 is put on the female connecting member 12 and the male connecting member 14 so as to cover a connecting part 18 of the female connecting member 12 and a curved part of the male connecting member 14. The female connecting member 12 and the male connecting member 14 are restrained from turning relative to each other by the engagement of the locking cover 32 with the curved part of the male connecting member 14.

FIG. 16 shows a locking structure for use in combination with a pipe connecting device having a female connecting member 12 and a straight male connecting member 14. As shown in FIG. 16, a locking cover 34 of a hard resin held on a stay 35. The stay 35 and the male connecting member 14 are attached to a body frame 30. Thus, the stay 35 and the male connecting member 14 belong to the same vibration system. As shown in FIG. 17, the locking cover 34 has a U-shaped cross section conforming to the oval cross section of the connecting part of the male connecting member 14. The locking cover 34 having such a shape restrains the female connecting member 12 and the male connecting member 14 from turning relative to each other.

FIG. 18 shows a locking structure for use in combination with a pipe connecting device having a female connecting member 12 and a male connecting member 14. A U-shaped clip 36 holds a tube 11 pressed in the female connecting member 12. As shown in FIG. 19, the clip 36 is held on a stay 37 and holds the tube 11 firmly so that the tube 11 is unable to turn. The stay 37 holding the clip 36 is attached to a body frame 30 to which the male connecting member 14 is attached. Thus the male connecting member 14 and the stay 37 belong to the same vibration system.

As mentioned above, the conventional quick-connection pipe connecting device needs locking covers or the like designed specially for different shapes of the connecting parts of pipes, different curvatures of pipes, different sizes of pipes, different conditions of actual piping, different conditions of vibrating systems and the like. Therefore, the quick-connection pipe connecting devices needs an increased number of parts, is costly and requires increased work for piping. Moreover, the conventional quick-connection pipe connecting device is subject to many restrictions including the shape and dimensions of retaining parts, and is incapable of dealing with changes in the piping and of being generally applied to various joints of pipes.

DISCLOSURE OF THE INVENTION

Accordingly, it is an object of the present invention to solve problems in the prior art and to provide a quick-connection pipe connecting device not requiring additional cover or the like, not subject to various restrictions placed by actual piping conditions, capable of surely restraining a female connecting member and a male connecting member from turning relative to each other, and capable of preventing the abrasion of O rings due to vibrations to enable the O rings maintain a satisfactory sealing ability for a long period of use.

According to the present invention, a pipe connecting device comprises: a male connecting member provided with an annular ridge; a female connecting member having a housing having a side provided with an opening; a retainer pressed in a lateral direction perpendicular to an axis of the female connecting member through the opening of the housing into the housing to unite the male connecting member and the female connecting member together; sealing means fitted in the female connecting member; and a locking means for restraining the male and the female connecting member from turning relative to each other; wherein the retainer is provided with retaining parts that engage with the annular ridge of the male connecting member to restrain the male connecting member from axial movement relative to the female connecting member, the locking means restrains the male and the female connecting member from turning relative to each other by the cooperation of the retaining parts and the male connecting member.

The male and the female connecting member are united together by the retainer, and the retaining parts of the retainer restrain the male connecting member from axial movement relative to the female connecting member and restrains the male connecting member from turning by engaging with a noncircular part of the male connecting member. Thus the male and the female connecting member are unable to turn relative to each other even if the male and the female are exposed to vibrations.

BRIEF DESCRIPTION OF THE DRAWINGS

FIGS. 12(a) and 12(b) are views of assistance in explaining the operation of the pipe connecting device in the fifth embodiment;

FIG. 13 is a view of a pipe connecting device in a modification of the pipe connecting device in the fifth embodiment;

BEST MODE FOR CARRYING OUT THE INVENTION

Pipe connecting devices in preferred embodiments according to the present invention will be described with reference to the accompanying drawings.

First Embodiment

Figure 1:
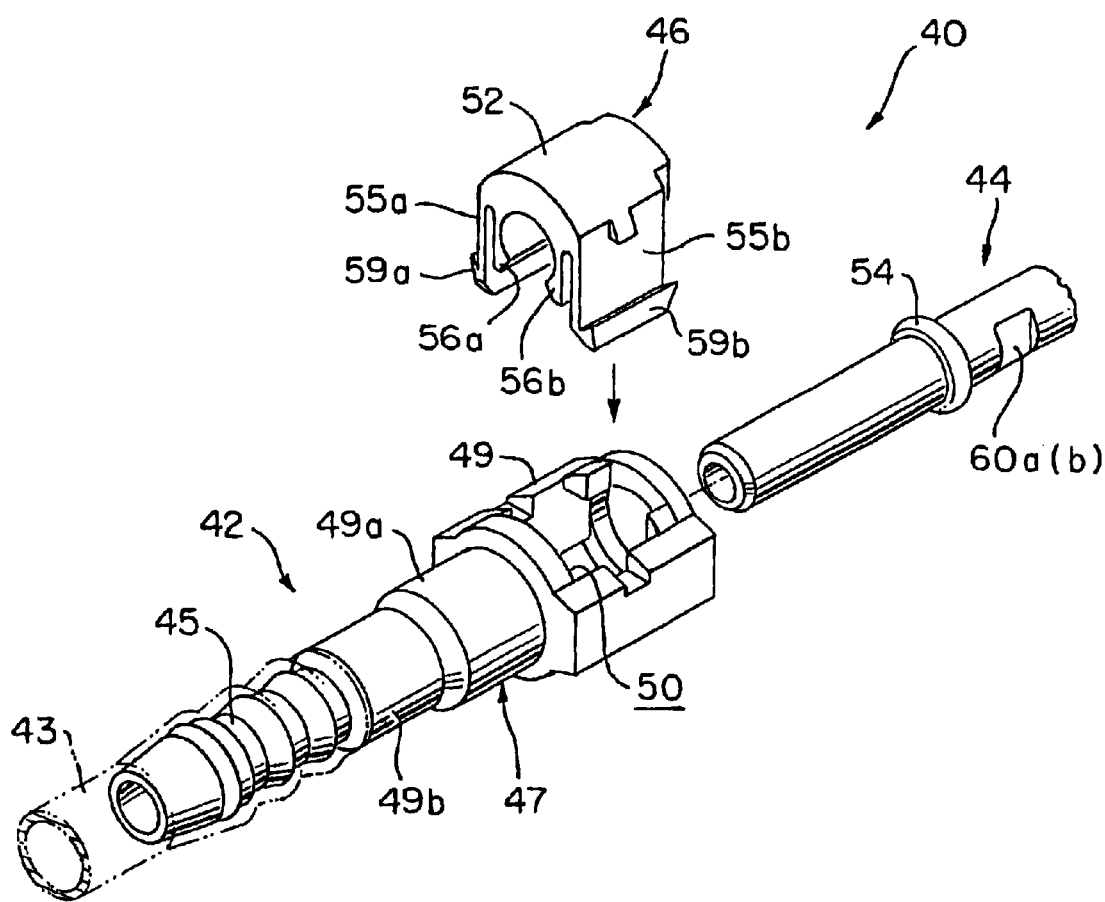
FIG. 1 is a perspective view of a pipe connecting device in a first embodiment according to the present invention.
Figure 2:
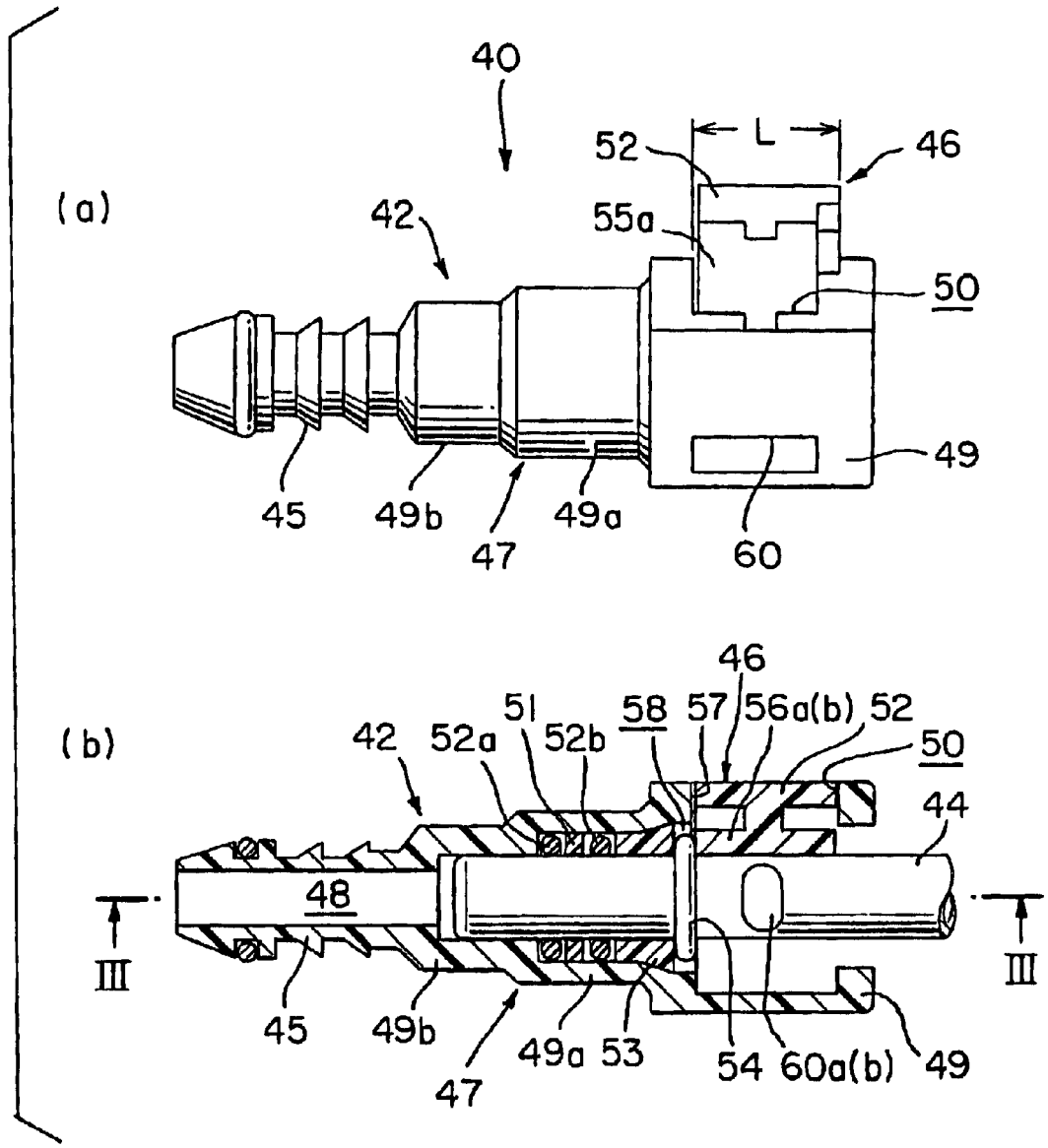
FIGS. 2(a) and 2(b) are a side elevation and a longitudinal sectional view, respectively, of the pipe connecting device in the first embodiment.

Referring to FIG. 1 showing a pipe connecting device 40 in a first embodiment according to the present invention, the pipe connecting device 40 comprises a female connecting member 42, a male connecting member 44, and a retainer 46 for uniting the female connecting member 42 and the male connecting member 44 together. FIG. 2(*b*) shows the female connecting member 42 and the male connecting member 44 completely united together by the retainer 46 in a longitudinal sectional view.

Basically, this embodiment is applicable to a pipe connecting device in which a retainer 46 is inserted laterally in a female connecting member 42 to unit the female connecting member 42 and a male connecting member 44 together. This embodiment is a quick-connection pipe connecting device having a false locking preventing structure. The false locking preventing structure is capable of making the retainer 46 unable to be properly pressed through an opening formed in a housing included in the female connecting member 42 into the housing 46 of the female connecting member 42 and unable to exercise its locking function when the male connecting member 44 is fitted incompletely in the female connecting member 42. When a quick-connection pipe connecting device of this kind is in a false-locked state, a male connecting member 44 fitted incompletely in a female connecting member 42 is in contact with an O ring 52*a* or 52*b* for sealing. In a false-locked state, it is possible that the incomplete connection of the female connecting member 42 and the male connecting member 44 is not recognized.

Referring to FIG. 1, the female connecting member 42 has a connecting part 45 to be pressed in a tube 43, and a cylindrical housing 47 formed integrally with the connecting part 45. As shown in FIG. 2(*b*), a stepped passage 48 is formed so as to extend through the female connecting member 42. The housing 47 has a connecting part 49 to receive the male connecting member 44. An opening 50 is formed in a side wall of the connecting part 49. The retainer 46 is pushed in a direction perpendicular to the axis of the female connecting member 42 through the opening 50 into the connecting part 49. The housing 47 has a first cylindrical part 49*a* axially extending from the connecting part 49, a second cylindrical part 49*b* having an outside diameter smaller than that of the first cylindrical part 49*a* and axially extending from the first cylindrical part 49*a*, and the connecting part 45 axially extending from the second cylindrical part 49*b*. As shown in FIG. 2(*b*), an O ring 52*a*, a spacer 51 and an O ring 52*b* are fitted in that order in the first cylindrical part 49*a* of the housing 47, and an O ring retainer 53 is fitted in the first cylindrical part 49*a* to prevent the O rings 52*a* and 52*b*, i.e., sealing means, from falling off the housing 47.

The male connecting member 44 is provided with an annular ridge 54 at a part of its outer circumference at a predetermined distance from its inner end. The retainer 46 inserted through the opening 50 in the connecting part 49 of the female connecting member engages with the annular ridge 54 to restrain the male connecting member 44 from axial movement relative to the female connecting member 42.

The retainer 46 is formed of a plastic material generally in a U-shape. The retainer 46 has a body 52 provided with parallel legs 55*a* and 55*b* respectively extending on the opposite sides of the body 52, and ribs 56*a* and 56*b* formed on the inner side of the legs 55*a* and 55*b*, respectively. The ribs 56*a* and 56*b* are pressed close to the outer surface of the male connecting member 44. As shown in FIGS. 2(*a*) and 2(*b*), the length, i.e., the axial dimension, of the retainer 46 is approximately equal to the length L of the opening 50 of the female connecting member 42. The width, i.e., the lateral dimension, of the retainer 46 is approximately equal to that of the opening 50. In a state where a front end part of the male connecting member 44 is pressed into the female connecting member 42 as deep as the annular ridge 54 of the male connecting member 44 is pressed against the O ring retainer 53, the annular ridge 54 is received in a space between the front end edge 57 of the opening 50 and the end back end surface of the O ring retainer 53, so that the retainer 46 can be pushed laterally through the opening 50 into the connecting part 49 of the female connecting member 42 without being interfered with by the annular ridge 54. The female connecting member 42 and the male connecting member 44 are able to turn relative to each other when the female connecting member 42 and the male connecting member 44 are simply united together by the retainer 46. Therefore the pipe connecting device is provided with the following locking structure.

Figure 3:
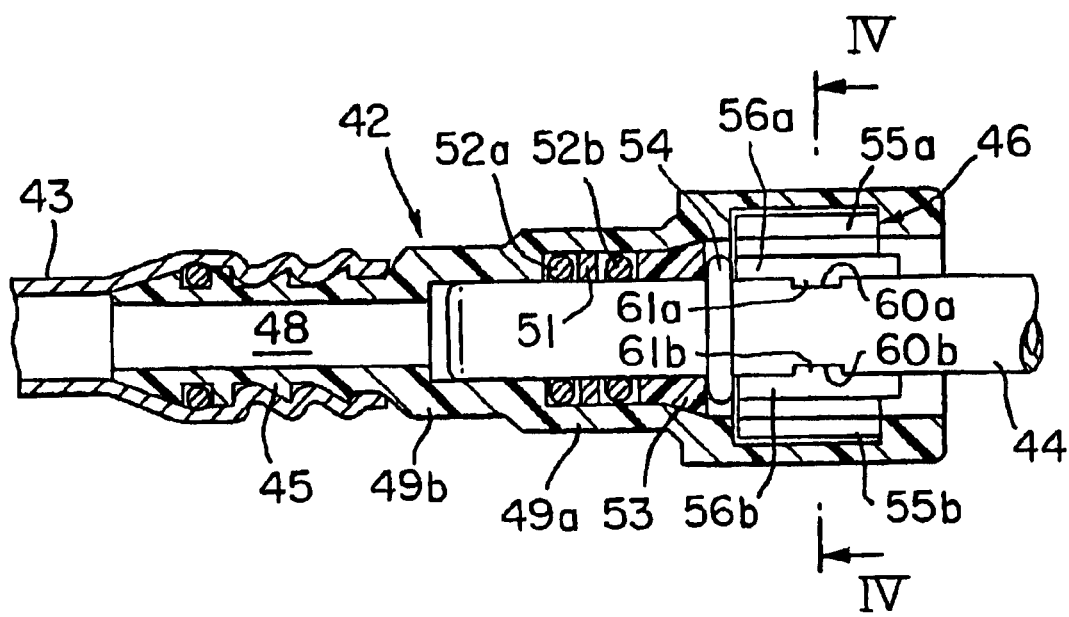
FIG. 3 is a longitudinal sectional view taken on line III—III in FIG. 2(b)
Figure 4:
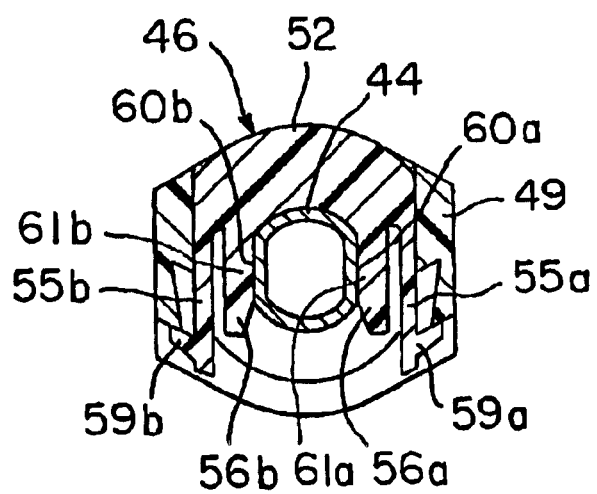
FIG. 4 is a cross-sectional view taken on line IV—IV in FIG. 3.

Referring to FIGS. 1, 3 and 4, the male connecting member 44 has a noncircular part having a noncircular cross section and provided with opposite flats 60*a* and 60*b*. The retaining parts 61*a* and 61*b* of the retainer 46 come into contact with the flats 60*a* and 60*b*, respectively. The ribs 56*a* and 56*b* of the retainer 46 is provided integrally with fixing parts 61*a* and 61*b*, respectively. The fixing parts 61*a* and 61*b* come into close contact with the flats 60*a* and 60*b* to restrain the male connecting part 44 from turning relative to the female connecting member 42. The fixing parts 61*a* and 61*b* of the ribs 56*a* and 56*b* are protrusions having flat inner surfaces capable of coming into close contact with the flats 60*a* and 60*b*, respectively.

The male connecting member 44 having the noncircular part provided with the flats 60*a* and 60*b* is fitted in the female connecting member 42 such that the flats 60*a* and 60*b* are parallel to a direction in which the retainer 46 is inserted in the female connecting member 42, and then the retainer 50 is pushed through the opening 50 into the female connecting member 42 as shown in FIG. 2(*a*). Consequently, ridges 59*a* and 59*b* (FIG. 1) formed on the outer side surfaces of the legs 55*a* and 55*b* of the retainer 46 engage with axial edges 60 formed in the connecting part 49, respectively, to lock the retainer 46 in place as shown in FIG. 2(*b*). When the retainer 46 is locked correctly, the ribs 56*a* and 56*b* of the retainer 46 engage the annular ridge 54 of the male connecting member 44 to restrain the male connecting member 44 from axial movement. Thus, the disconnection of the male connecting member 44 from the female connecting member 42 can be prevented and the female connecting member 42 and the male connecting member 44 are united firmly together.

In a state where the female connecting member 42 and the male connecting member 44 are thus united together, the inner side surfaces of the fixing parts 61*a* and 61*b* of the ribs 56*a* and 56*b* of the retainer 46 are in close contact with the flats 60*a* and 60*b*, respectively, of the noncircular part of the male connecting member 44 as shown in FIGS. 3 and 4. Therefore, even if vibrations are transmitted to the female connecting member 42 and the male connecting member 44, the female connecting member 42 and the male connecting member 44 are restrained perfectly from turning relative to each other. Accordingly, the abrasion of the O rings 52a and 52b fitted in the female connecting member 42 by frictional rubbing by the male connecting member 44 can be prevented, and the o rings 52a and 52b are able to maintain their sealing effect for a long period of use.

The internal locking structure of the pipe connecting device can be simply formed by changing the shape of a part of the male connecting member 44 and using the ribs 56a and 56b of the retainer 46 for restraining the axial movement of the male connecting member 44 relative to the female connecting member 42. Therefore, the pipe connecting device 40 does not need any locking structures designed specially for different shapes of the connecting parts of pipes, different curvatures of pipes, different sizes of pipes, different conditions of actual piping, different conditions of vibrating systems and the like. The retainer 46 is capable of exercising both a connecting function to unit the female connecting member 42 and the male connecting member 44 together and a locking function to restrain the male connecting member 44 from turning relative to the female connecting member 42. Thus, the pipe connecting device 40 is not subject to restrictions placed by piping conditions and has widely different uses.

The locking structure can be readily formed by using the retainer 46, which is pushed laterally through the opening 50 into the female connecting member 42, having the shape capable of preventing false locking. The pipe connecting device of the present invention is far superior to the conventional quick-connection pipe connecting devices in performance and quality.

Second Embodiment

Figure 5:
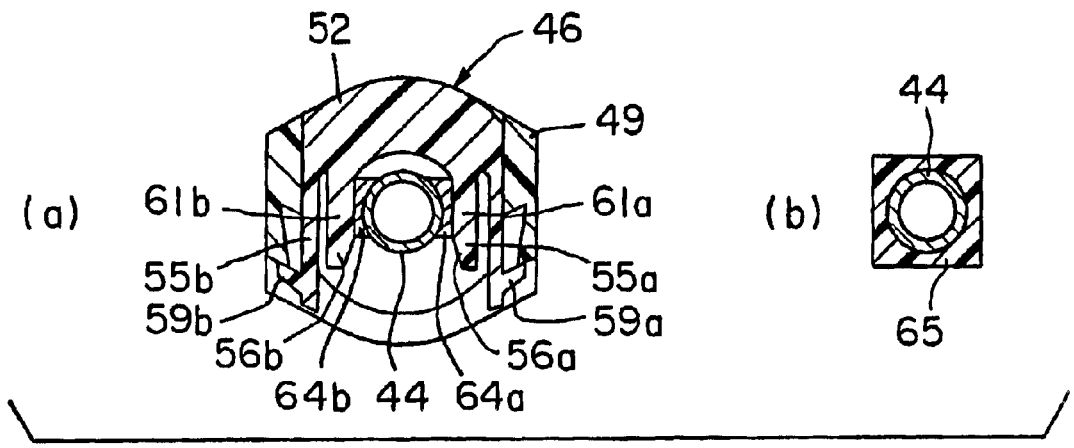
FIGS. 5(a) and 5(b) are a cross sectional view of a pipe connecting device in a second embodiment according to the present invention and a cross sectional view of a male connecting member in a modification of the male connecting member shown in FIG. 5(a), respectively.

A pipe connecting device in a second embodiment according to the present invention will be described with reference to FIG. 5. The pipe connecting device in the second embodiment includes a male connecting member 44 different from that of the pipe connecting device in the first embodiment. As shown in FIG. 5(a) in a cross-sectional view, locking members 64a and 64b are welded or brazed to the outer surface of the male pipe connecting member 44. The locking members 64a and 64b have curved inner surfaces conforming to the outer circumference of the male connecting member 44, and flat outer surfaces, respectively. A retainer 46 has ribs 56a and 56b provided integrally with fixing parts 61a and 61b, respectively. The fixing parts 61a and 61b come into close contact with the flat outer surfaces of locking members 64a and 64b to restrain the male connecting part 44 from turning relative to a female connecting member, not shown.

FIG. 5(b) shows a male connecting member 44 fixedly provided with a locking member 65 of a rectangular cross section formed by molding. The locking member 65 has two sets each of two opposite, parallel surfaces. The inner surfaces of the fixing parts 61a and 61b of the ribs 56a and 56b of the retainer 46 come into close contact with one of the two sets of opposite parallel surfaces. The locking member 65 may be formed in a square cross section to enable the fixing parts 61a and 61b are able to come into close contact with either of the two sets of opposite, parallel surfaces.

Third Embodiment

Figure 6:
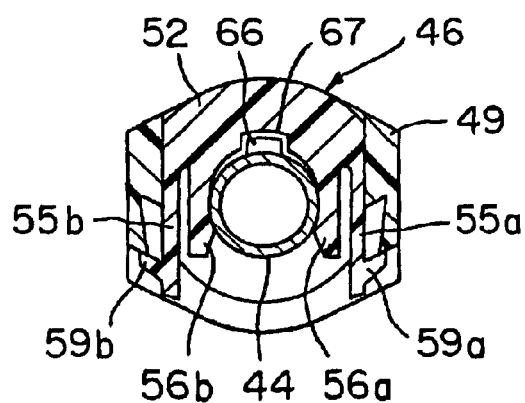
FIG. 6 is a cross sectional view of a pipe connecting device in a third embodiment according to the present invention.

FIG. 3 is a cross-sectional view of a pipe connecting device in a third embodiment according to the present invention. As shown in FIG. 6, a noncircular part of a male connecting member 44 is provided on its outer surface with a protrusion 66 welded thereto or formed by resin-molding. The protrusion 66 is able to engage in a recess 67 formed in the inner surface of a body 52 included in a retainer 46. The protrusion 66 and the body 52 provided with the recess 67 constitute a locking structure capable of surely preventing the turning of the male connecting member 44 and a female connecting member, not shown, relative to each other.

Fourth Embodiment

Figure 7:
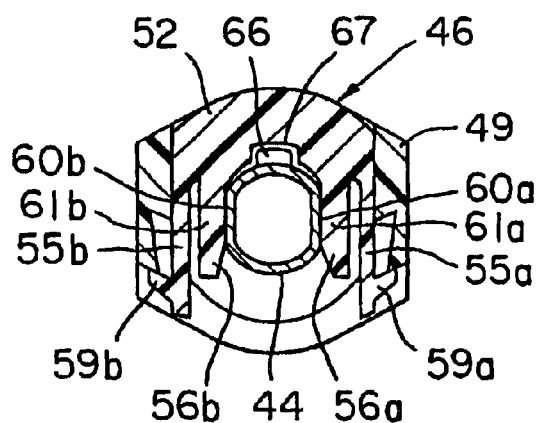
FIG. 7 is a cross sectional view of a pipe connecting device in a fourth embodiment according to the present invention.

FIG. 7 is a cross-sectional view of a pipe connecting device in a fourth embodiment according to the present invention. As shown in FIG. 7, a male connecting member 44 has, in combination, a noncircular part having flats 60a and 60b similar to those shown in FIG. 4, and a protrusion 66 similar to that shown in FIG. 6. The noncircular part of the male connecting member 44 may be provided with concave, curved surfaces instead of the flats 60a and 60b similar to those shown in FIG. 4 or may be provided with the locking members 64a and 64b shown in FIG. 5 and the protrusion 66 shown in FIG. 6 in combination.

Fifth Embodiment

Figure 8:
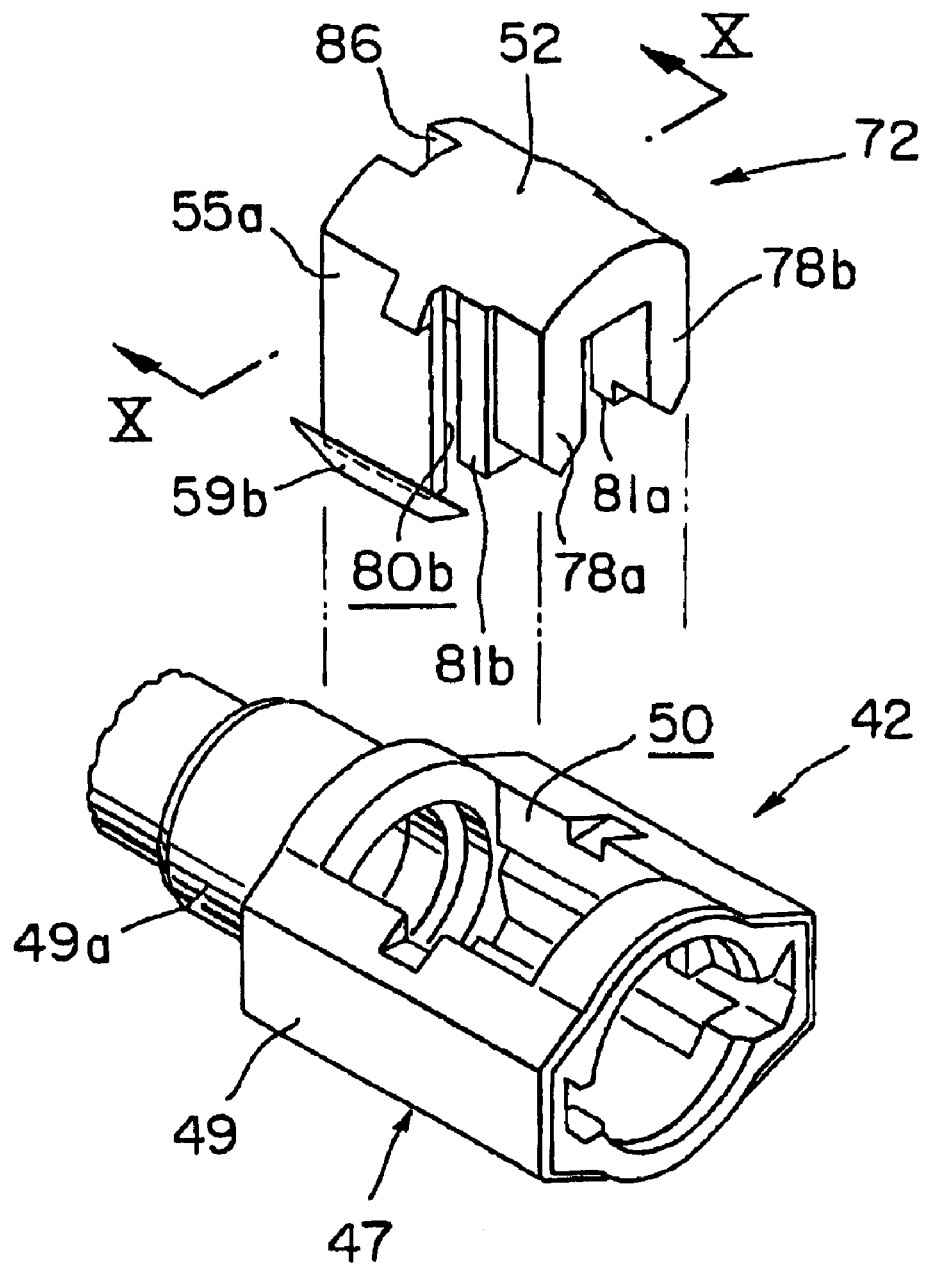
FIG. 8 is a cross sectional view of a pipe connecting device in a fifth embodiment according to the present invention.
Figure 9:
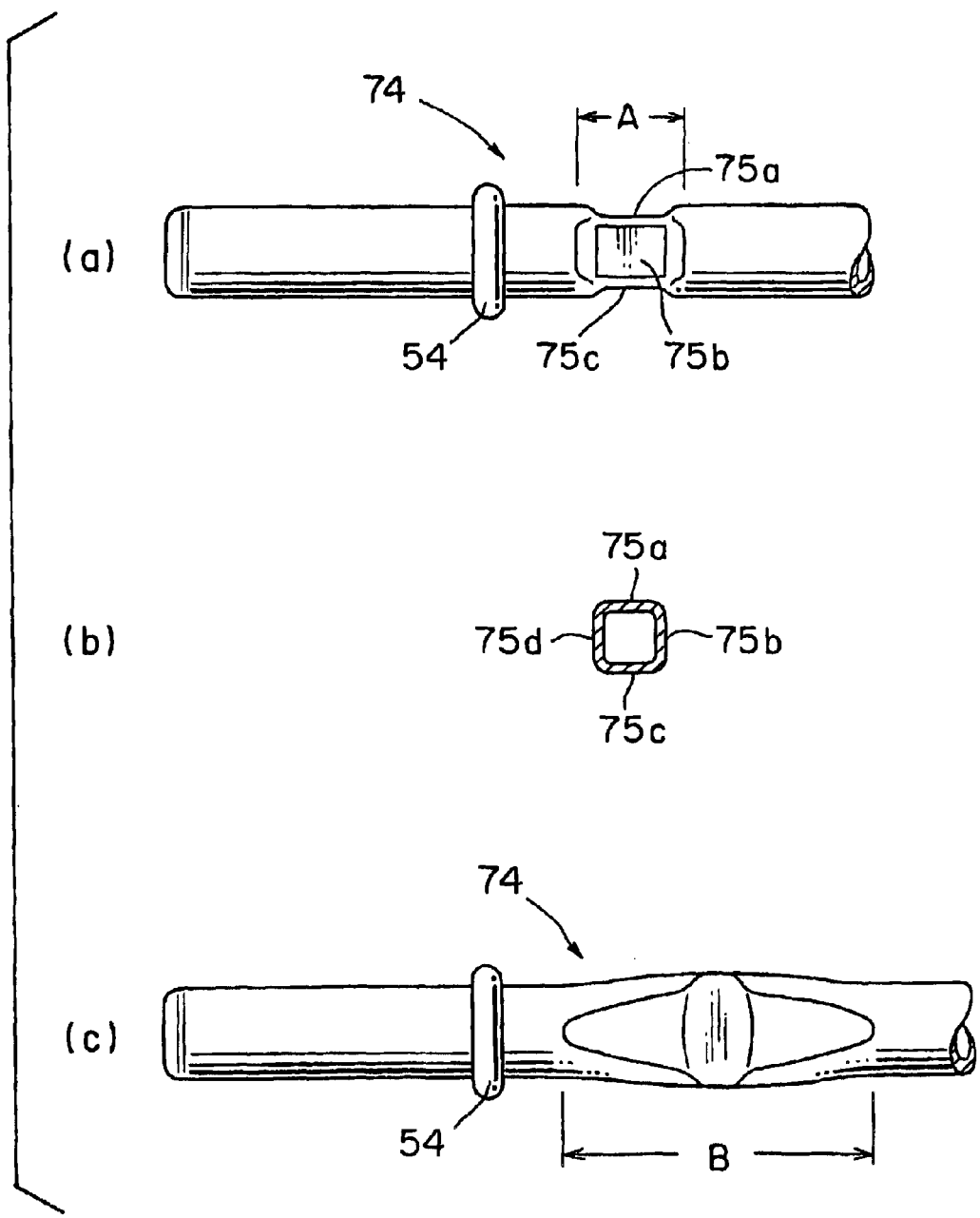
FIGS. 9(a), 9(b) and 9(c) are a side elevation, a sectional view, and a side elevation with a noncircular part crushed, of a male connecting member included in a pipe connecting device in the fifth embodiment.

A pipe connecting device in a fifth embodiment according to the present invention will be described with reference to FIGS. 8 to 11. FIG. 8 shows a female connecting member 42 and a retainer 72 included in the pipe connecting device in the fifth embodiment, and FIG. 9 shows and end part of a metal pipe serving as a male connecting member 74. In FIG. 8, a connecting part of the female connecting member 42 to be pressed in a resin tube is omitted. The female connecting member 42 is substantially identical with that shown in FIG. 1 and parts like or corresponding to those shown in FIG. 1 are denoted by the same reference characters.

Referring to FIGS. 9(a) and 9(b), the male connecting member 74 of the pipe connecting device in the fifth embodiment has a noncircular part having a substantially square cross section. The edges of the noncircular part are rounded. The noncircular part has four flat surfaces 75a to 75d formed by pressing a part of the male connecting member 74 on the outer side of an annular ridge 54 from four directions. The noncircular part can be formed in a minimum necessary length A by pressing the part from four directions and hence the noncircular part can be formed near the annular ridge 54. A noncircular part formed by pressing a male connecting member 74 from two opposite directions as shown in FIG. 9(c) inevitably has a long length B. When the noncircular part is formed near the annular ridge 54, the pipe connecting device can be formed in a short overall length, which is favorable to reducing space necessary for installing the pipe connecting device. The noncircular part can be formed in a polygonal cross section having sides not less than those of a pentagon. However increase in the number of sides of the cross section of the noncircular part reduces the locking effect of the noncircular part. The noncircular part having the square cross section as shown in FIG. 9(b) is most preferable.

Figure 10:
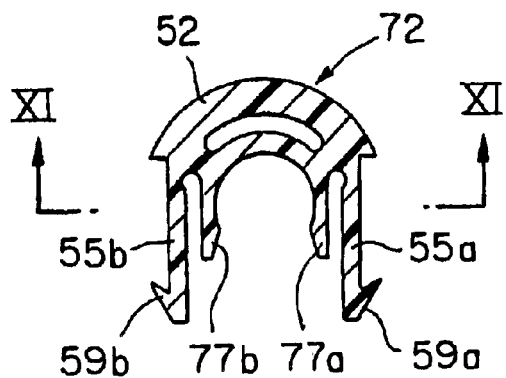
FIG. 10 is a sectional view taken on line X—X in FIG. 8.
Figure 11:
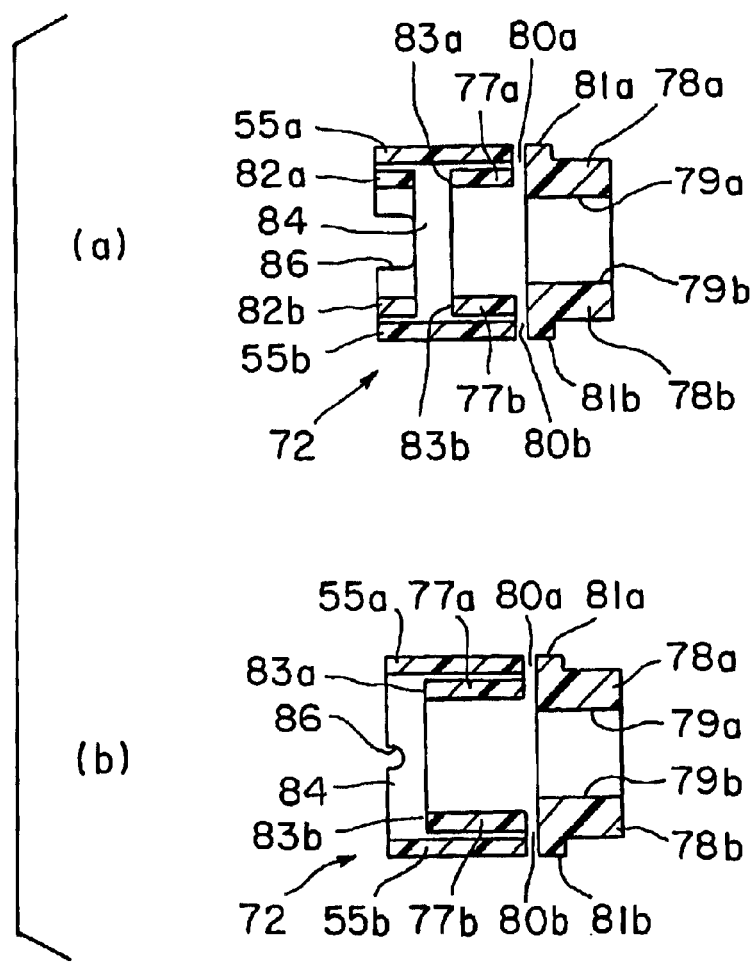
FIGS. 11(a) and 11(b) are a sectional view taken on line XI—XI in FIG. 10, and a sectional view of a retainer included in a modification, respectively.
Figure 14:
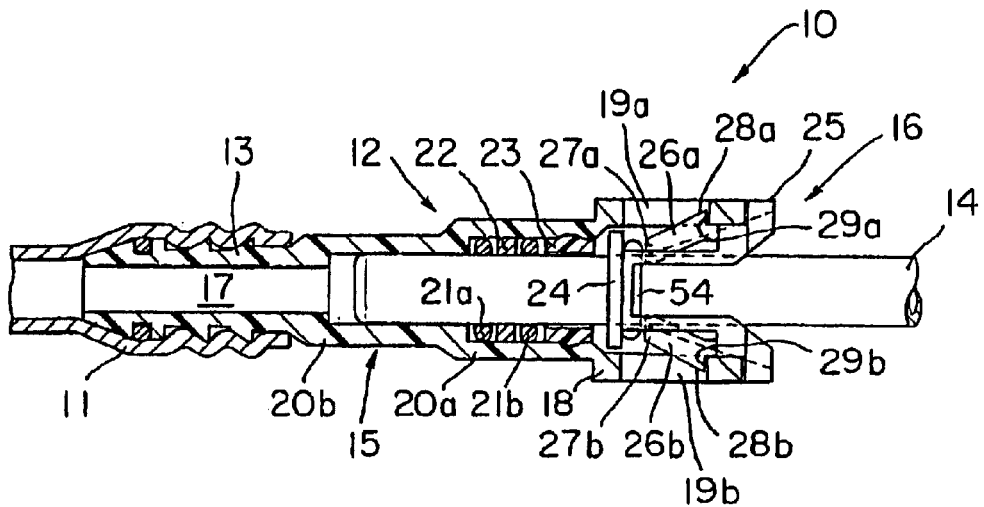
FIG. 14 is a longitudinal sectional view of a conventional pipe connecting device.
Figure 15:
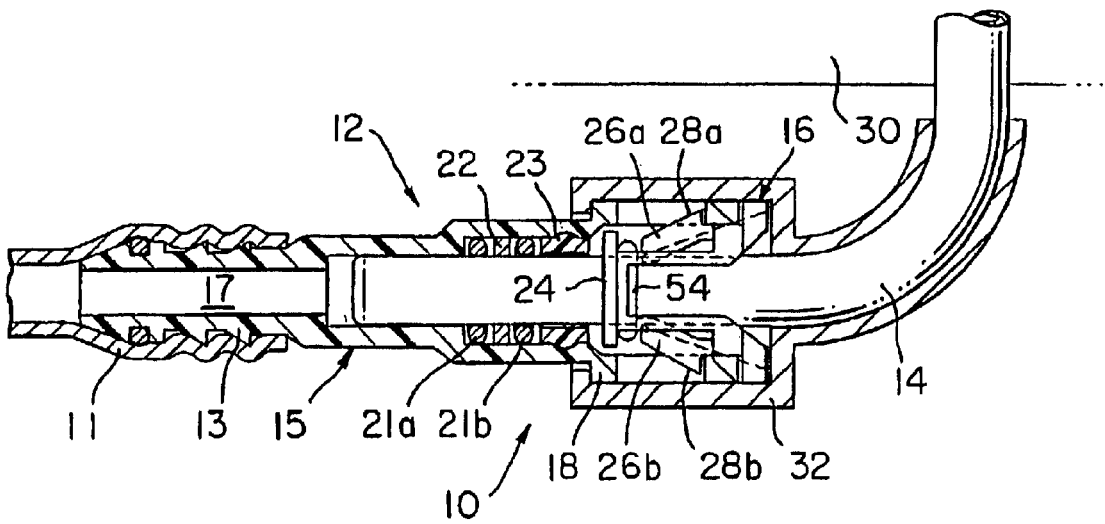
FIG. 15 is a view of a locking cover included in a conventional pipe connecting device.
Figure 16:
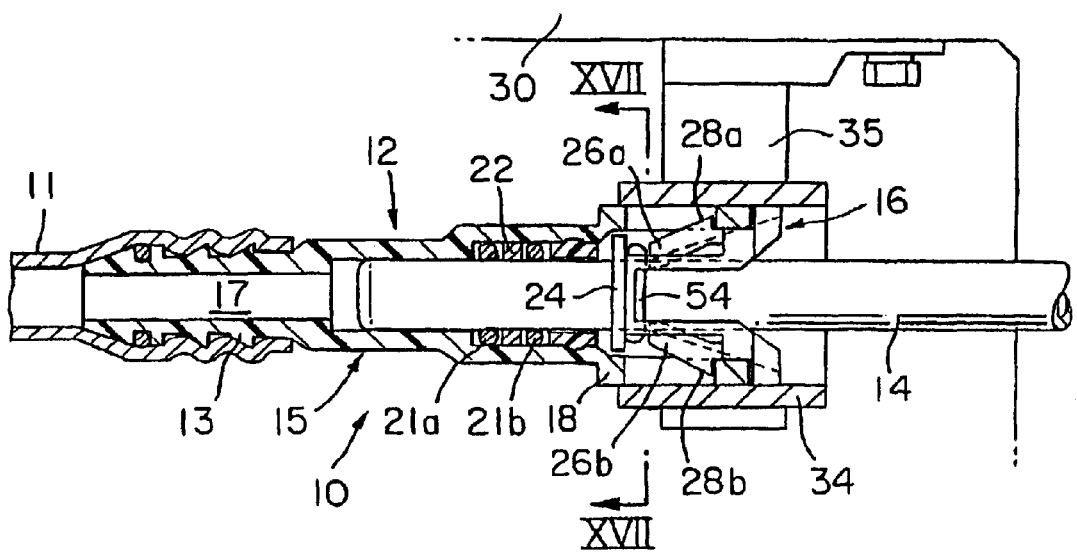
FIG. 16 is a sectional view of another conventional locking cover.
Figure 17:
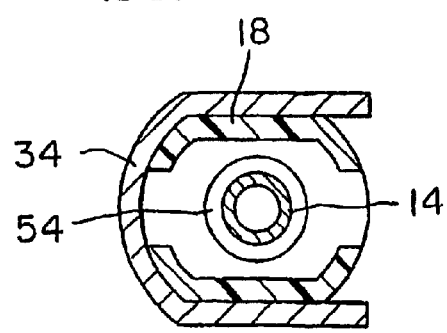
FIG. 17 is a cross sectional view of the locking cover shown in FIG. 16.
Figure 18:
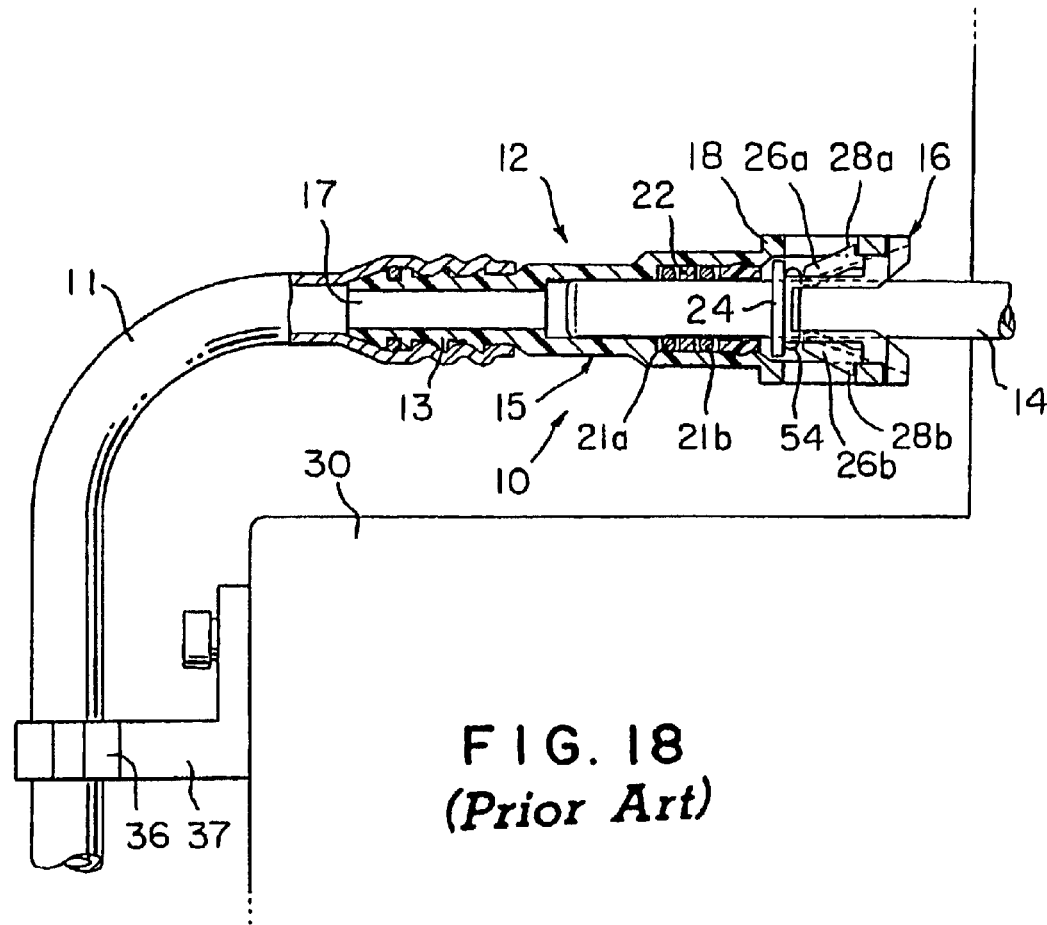
FIG. 18 is a sectional view of a third conventional locking cover.
Figure 19:
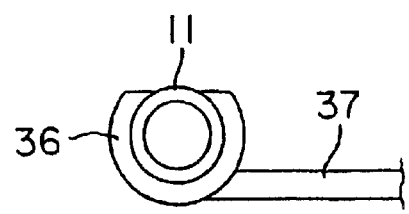
FIG. 19 is a cross-sectional view of the locking cover shown in FIG. 18.

As shown in FIGS. 8 and 11, a retainer 72 included in the pipe connecting device in the fifth embodiment has retaining ribs 77a and 77b that engage with the annular ridge 54 of the male connecting member 74 to restrain the male connecting member 74 from axial movement, and fixing ribs 78a and 78b that engage with the noncircular part of the male connecting member 74. The ribs 77a and 77b are spaced from the ribs 77a and 77b by slits 80a and 80b, respectively. Since the retaining ribs 77a and 77b are spaced from the fixing ribs 78a and 78b, legs 55a and 55b are short. As shown in FIG. 10, the retaining ribs 77a and 77b are comparatively thin ribs curving in a U-shape. As shown in FIGS. 8 and 11, the fixing ribs 78a and 78b are thick ribs respectively having opposite, parallel contact surfaces 79a and 79b. The fixing ribs 78a and 78b are formed such that the distance between the contact surfaces 79a and 79b is substantially equal to the width of the noncircular part so that the noncircular part of the male connecting member 74 can be close fitted in a space between the contact surfaces 79a and 79b of the fixing ribs 78a and 78b. Reinforcing ribs 81a and 81b are formed on the outer surfaces of the fixing ribs 78a and 78b so as to extend along the slits 80a and 80b, respectively. When the retainer 72 is pressed into the housing 47 of the female connecting member 42, the reinforcing ribs 81a and 81b are pressed against the inner surfaces of the housing 47.

As shown in FIG. 11(a), the retainer 72 of the pipe connecting device in the fifth embodiment is integrally provided, in addition to the retaining ribs 77a and 77b, with O ring retainer holding ribs 82a and 82b to hold an O ring retainer 53 (FIG. 2) in place. The O ring retainer holding ribs 82a and 82b are formed at positions at a distance greater than the width of the annular ridge 54 of the male connecting member 74 from the end edges 83a and 83b of the retaining ribs 77a and 77b. When front end part of the male connecting member 74 is pushed properly into the female connecting member 42, the annular ridge 54 is located right in a space 84 between the end edges 83a and 83b of the retaining ribs 77a and 77b, and the O ring retainer holding ribs 82a and 82b. When the retainer 72 is pressed into the female connecting member 42 with the male connecting member 74 fitted correctly in the female connecting member 42, the end edges 83a and 83b of the retaining ribs 77a and 77b engage with the annular ridge 54 of the male connecting member 74 to restrain the male connecting member 74 from axial movement relative to the female connecting member 42.

A part between the O ring retainer holding ribs 82a and 82b of a body 52 included in the retainer 72 is cut to form a drain hole 86 for draining water from the space 84. Since water is unable to stay in the space 84, the corrosion of the male connecting member 74 can be avoided even if the male connecting member 74 is formed of a metal.

FIG. 11(b) shows a retainer 72 in a modification of the retainer 72 shown in FIG. 11(a). The retainer 72 shown in FIG. 11(b) is not provided with any parts corresponding to the O ring retainer holding ribs 82a and 82b. Retaining ribs 77a and 77b shown in FIG. 11(b) have a length greater than that of the retaining ribs 77a and 77b shown in FIG. 11(a) by a length corresponding to that of the O ring retainer holding ribs 82a and 82b.

The retaining ribs 77a and 77b for restraining the male connecting member 74 from axial movement, and the fixing ribs 78a and 78b forming a locking structure together with the noncircular part of the male connecting member 74 are separated by the slits 80a and 80b, and the fixing ribs 78a and 78b having high rigidity can be formed in a big thickness. Since the highly rigid fixing ribs 78a and 78b are difficult to bent, the fixing ribs 78a and 78b have a high fixing ability to restrain the male connecting member 74 from turning and hence the male connecting member 74 connected to the female connecting member 42 can be restrained from turning relative to the female connecting member 42 with reliability.

Even if the noncircular part of the male connecting member 74 is placed in an angular position as shown in FIG. 12(a), in which none of the flat surfaces 75a to 75d of the noncircular part is not parallel to the contact surfaces 79a and 79b of the fixing ribs 78a and 78b, the highly rigid fixing ribs 78a and 78b do not bend when the retainer 72 is pressed into the female connecting member 42 and the fixing ribs 78a and 78b are brought into engagement with the flat surfaces 75a and 75d, and the fixing ribs 78a and 78b force the male connecting member 74 to turn to a correct position in which the fixing ribs 78a and 78b come into contact with the flat surfaces 75a and 75c or the flat surfaces 75b and 75d. Therefore, the retainer 72 is able to unite the female connecting member 42 and the male connecting member 74 even if the retainer 72 is pressed into the female connecting member 42 without confirming the angular position of the noncircular part of the male connecting member 74. Since the reinforcing ribs 81a and 81b formed on the outer surfaces of the fixing ribs 78a and 78b are in contact with the inner surfaces of the housing 47 of the female connecting member 42 while the retainer 72 is being pressed into the housing 47, the fixing ribs 78a and 78b can be surely prevented from bending. Preferably, the inner side surfaces of edge parts of the fixing ribs 78a and 78b are beveled to form inner beveled surfaces 87a and 87b extending away from each other toward the edges, respectively.

FIG. 13 shows fixing ribs 78a and 78b in modifications. These fixing ribs 78a and 78b have fixing surfaces 79a and 79b, inner beveled surfaces 87a and 87b, and protrusions 88a and 88b protruding toward the intersections of the fixing surfaces 79a and 79b, and the inner beveled surfaces 87a and 87b, respectively. The inner surfaces of the protrusions 88a and 88b are curved so as to conform to rounded lower parts of the flat surfaces 75b and 75d of the noncircular part. The fixing ribs 78a and 78b are able to come into close contact with the noncircular part of the male connecting member 74 to hold the noncircular part more satisfactorily between them.

As apparent from the foregoing description, according to the present invention, the female connecting member and the male connecting member can be surely prevented from turning relative to each other, and hence any additional locking cover designed specially for piping conditions, which is needed by the conventional pipe connecting device, is not needed. The pipe connecting device of the present invention can be applied generally to various uses without being subject to various restrictions placed by actual piping conditions, and is capable of preventing the abrasion of the O rings due to vibrations to enable the O rings maintain a satisfactory sealing ability for a long period of use.

Since the locking structure restrains the female connecting member and the male connecting member from turning relative to each other by the cooperative operation of the retaining parts of the retainer, and the male connecting member, the retaining parts can be used not only as means that engage with the annular ridge of the male connecting member to restrain the male connecting member from axial movement relative to the female connecting member, but also as means for preventing the turning of the female connecting member and the male connecting member relative to each other.

What is claimed is:

1. A pipe connecting device comprising:
   a male connecting member provided with an annular ridge;
   a female connecting member having a housing having a side provided with an opening;
   a retainer pressed in a lateral direction perpendicular to an axis of the female connecting member through the opening of the housing into the housing to unite the male connecting member and the female connecting member together;

sealing means fitted in the female connecting member; and a locking means for restraining the male and the female connecting member from turning relative to each other;

wherein the retainer is provided with retaining parts that engage with the annular ridge of the male connecting member to restrain the male connecting member from axial movement relative to the female connecting member, the locking means restrains the male and the female connecting member from turning relative to each other by the cooperation of the retaining parts and the male connecting member, wherein the retaining parts are ribs extending along an outer circumference of the male connecting member in a U-shape, and the locking means includes a noncircular part formed in the male connecting member and having a noncircular cross section, and fixing parts formed in the ribs and capable of engaging with the noncircular part to restrain the male connecting member from turning.

2. The pipe connecting device according to claim 1, wherein the ribs of the retainer are provided with slits separating the retaining parts and the fixing parts from each other, respectively.

3. The pipe connecting device according to claim 1, wherein the noncircular part of the male connecting member has flat or curved surfaces formed by deforming parts of a tubular body included in the male connecting member.

4. The pipe connecting device according to claim 3, wherein the noncircular part of the male connecting member has a square or rectangular cross section and has four sides.

5. The pipe connecting device according to claim 4, wherein reinforcing ribs are formed on outer side surfaces of the fixing parts so as to come into contact with inner side surfaces of the housing.

6. The pipe connecting device according to claim 1, wherein the noncircular part of the male connecting member is formed by fixedly attaching a locking member to the outer circumference of a tubular body included in the male connecting member.

7. The pipe connecting device according to claim 1, wherein the noncircular part of the male connecting member is a protrusion formed on the outer circumference of a tubular body included in the male connecting member, and the retainer is provided with a recess serving as a fixing part and capable of receiving the protrusion of the male connecting member therein.

8. The pipe connecting device according to claim 3, wherein the noncircular part of the male connecting member includes, in combination, flat or curved surfaces formed in parts of the outer circumference of the male connecting member, and the protrusion.

9. The pipe connecting device according to claim 1, wherein the sealing means are O rings.

10. The pipe connecting device according to claim 1, wherein the retainer includes a false locking preventing structure capable of making the retainer unable to be properly pressed into the housing of the female connecting member and unable to exercise its locking function when the male connecting member is fitted incompletely in the female connecting member.

* * * * *